Feb. 3, 1970

J. L. HELLMANN 3,493,835

NOISELESS MOTOR SWITCH

Filed May 1, 1967

TIME ⟶

INVENTOR
JOHN L. HELLMANN

BY Donald F. Voss
ATTORNEY

United States Patent Office 3,493,835
Patented Feb. 3, 1970

3,493,835
NOISELESS MOTOR SWITCH
John L. Hellmann, Rochester, Minn., assignor to International Business Machines Corporation, Armonk, N.Y., a corporation of New York
Filed May 1, 1967, Ser. No. 635,026
Int. Cl. H02p 1/16
U.S. Cl. 318—447                              3 Claims

ABSTRACT OF THE DISCLOSURE

Stepped down A.C. line voltage is applied across one diagonal of a diode bridge. A shunt or control silicon controlled rectifier (SCR) is connected across the other diagonal of the bridge. Gate current for the control SCR is derived via a resistor and applied through a switch which is normally closed until the motor is to be started. However, opening of the switch does not immediately start the motor via another bridge circuit because the control SCR continues to conduct until its holding current goes to zero. This occurs when the line voltage goes through zero. Hence, the motor starts without a noise spike which otherwise would occur when applying peak line voltage across the distributed capacitance of the motor windings.

Background of the invention

The invention relates to noiseless motor switch circuits and more particularly to motor switch circuits which include a control circuit for sensing when the line voltage goes through zero.

Description of the prior art

In the past, it has been common for motor starting circuits to utilize a heavy duty relay to open and close the current carrying contacts placed in series with the motor windings. Further, it is quite common in motor starting circuits to use a bridge circuit connected across an A.C. line and in series with a load. However, the prior art does not contemplate a load switching circuit which includes a circuit for applying the A.C. line voltage to the load only as the A.C. line voltage goes through zero.

Summary

The principal objective of the invention is to provide a load switching circuit which eliminates electrical noise attendant with load switching. This is done by connecting the line voltage to the load as close as possible to the zero portion of the A.C. voltage waveform. Other objectives are to perform this kind of load switching at relatively low cost and with simple components. It is recognized that the cost of the switching circuit per se is more than that for a relay switching circuit. However, the elimination of electrical noise far outweighs the additional cost. This is particularly so for data processing machines where electrical noise can cause serious erroneous results.

Detailed description

Figure 2:
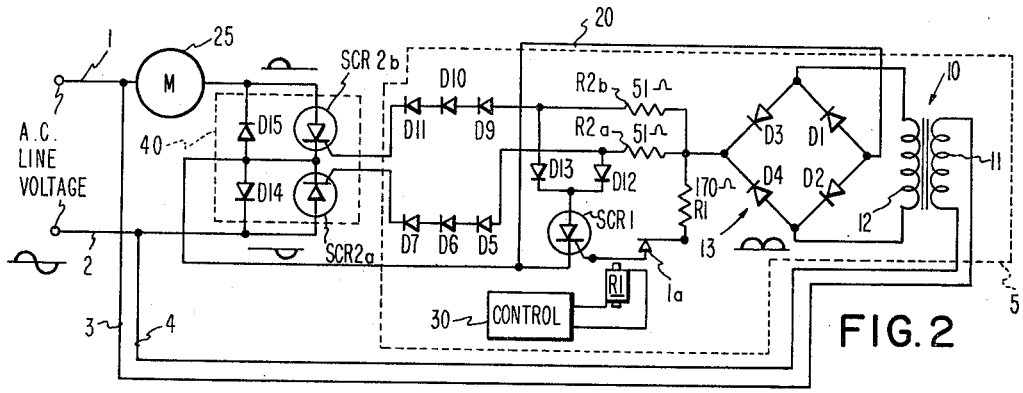
FIG. 2 is a schematic circuit diagram of a motor switching circuit of ap referred embodiment of the invention.
Figure 1:
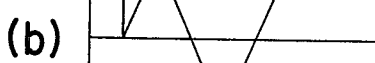
FIG. 1 is a schematic block diagram showing the motor, motor switch and motor switch control circuit.
Figure 1:
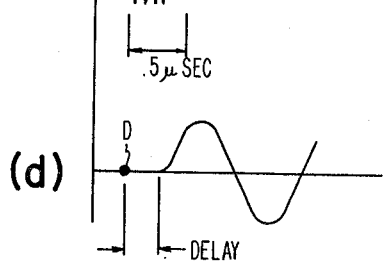
Figure 1:
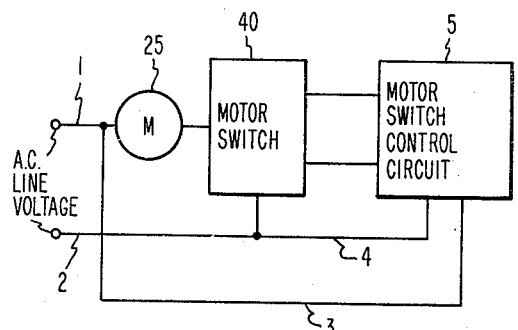

With reference to the drawings, and particularly to FIG. 1, the invention is shown by way of example as including motor 25 connected between one side of the line voltage and a motor switch 40. The motor switch 40 is also connected to the other side of the line voltage. A motor switch control circuit 5 has inputs connected to both sides of the line voltage and inputs connected to motor switch 40. The first embodiment, as shown in FIG. 2, includes a transformer 10 having a primary coil 11 connected to conductors 3 and 4 which are in turn connected to input conductors 1 and 2 respectively. A secondary coil 12 is connected across one diagonal of a diode bridge 13 formed by diodes D1, D2, D3 and D4. Transformer 10 facilitates sensing the line voltage and bridge 13 rectifies the voltage such that the voltage reaches a peak and then goes to zero and then again reaches a peak and goes to zero in the well-known manner of full wave rectification.

The rectified voltage is applied to resistor R1, R2a and R2b to develop gate current for silicon controlled rectifiers SCR1, SCR2a and SCR2b, respectively. Resistor R1 is in series with normally closed contact 1a of relay R1. The contact 1a is in series with the gate of SCR1. Resistors R2a and R2b are connected in series with series connected diodes D5, D6, D7 and series connected diodes D9, D10 and D11, respectively. SCR1 is a control device and functions to shunt gate current away from SCR2a and SCR2b when relay contact R1a is closed. Resistor 1a provides sufficient gate current to SCR1 to fire it much earlier than the firing of SCR2a or SCR2b. Diodes D12 and D13 in the anode circuit of SCR1 function as back circuit diodes. Diodes D5, D6 and D7 for example, in combination with resistor R2a provide an impedance path together with the gate to cathode impedance of SCR2a which is greater than the anode to cathode impedance of SCR1, when SCR1 is conducting. The combination of diodes D9, D10, D11, resistor R2b and the gate to cathode impedance of SCR2b provides an impedance path which is greater than the anode to cathode impedance of SCR1 when it is conducting. Diodes D5 and D9 balance out the impedance effects of back circuit diodes D12 and D13. It should also be noted that because of manufacturing tolerance the gate currents required to fire SCR2a and SCR2b could be different. Hence, this is the reason for the parallel paths which prevent either SCR2a or SCR2b from acting as a shunt. If this occurred, it would not be possible to fire the proper SCR.

SCR2a and SCR2b form a bridge circuit with diodes D14 and D15. The cathodes of SCR2a and SCR2b are commonly connected to each other and are connected to the commonly connected anodes of diodes D14 and D15. A conductor 20 connects the anodes of D14 and D15 and the cathodes of SCR1, SCR2a and SCR2b to the anodes of diodes D1 and D2 of bridge 13. Further, the anode of SCR2a and the cathode of diode D14 are connected to input conductor 2. The anode of SCR2b and the cathode of diode D15 are connected to one side of the load or motor 25 which has its other side connected to input conductor 1.

Relay R1 is connected to be energized by control 30. Control 30 could simply be a switch or a combination of logical elements for providing an energizing pulse upon certain conditions being met. These conditions could be that the machine to be operated by motor 25 is ready and the start switch has been closed. Of course, when relay R1 is energized, contact 1a opens.

With relay R1 de-energized and contact 1a closed, starting current does not flow through motor 25 because SCR1 will conduct as the A.C. line voltage approaches a peak and thus prevent SCR2a and SCR2b from conducting. As SCR1 conducts, it shunts current away from the gates of SCR2a and SCR2b to hold the same out of conduction. The circuit, of course, is designed so that SCR1 fires or conducts first. When relay R1 is energized, contact 1a opens. However, SCR1 continues to conduct until its holding current goes to zero. This occurs when the line voltage goes to zero which is at the end of the particular half cycle. Then during the next half cycle, gate current is provided to SCR2a and SCR2b. Either SCR2a or SCR2b will fire, depending upon the polarity of the input voltage at this time. With either SCR2a or SCR2b conducting, starting current flows through motor 25 and the same comes up to speed. The motor 25 continues to run until relay R1 is de-energized.

Figure 3:
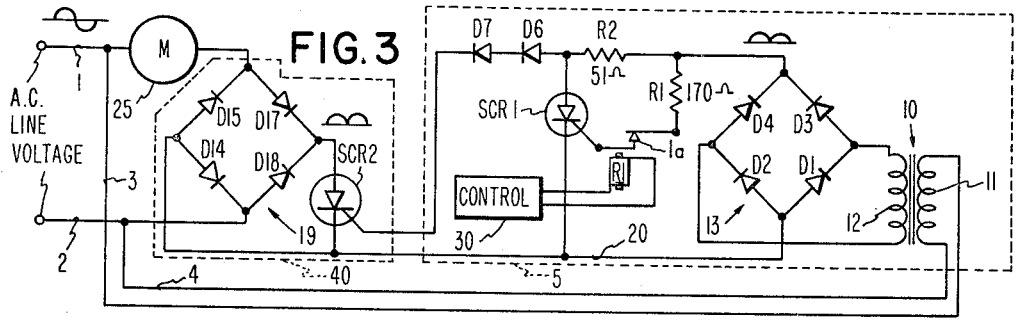
FIG. 3 is a schematic circuit diagram of a motor switching circuit of another embodiment of the invention; and,
FIG. 4 is a series of waveforms illustrating (a) the line voltage, (b) motor current without noiseless switching, (c) spike characteristics, and (d) motor current with noiseless switching.

The load starting or switching circuit of FIG. 3 is very similar to that of FIG. 2 and like components are given like reference numbers. The combination of SCR2a, SCR2b and diodes D14 and D15 of FIG. 2 has been replaced by SCR2 and diode bridge circuit 19 which includes diodes D14, D15, D17 and D18. With relay R1 de-energized, SCR1 conducts as described in connection with FIG. 2. SCR2 conducts after contact R1a opens, and when SCR1 ceases to conduct, and when the line voltage again builds up to a peak. Starting current flows through motor 25 when SCR2 conducts. SCR2 continues to conduct and motor 25 continues to run as relay R1 remains energized.

Transformer 10, bridge 13 and SCR1 with associated diodes for the circuits of FIG. 2 and FIG. 3 can be considered to be control circuit 5 for controlling the operation of motor switch 40 formed by SCR2a, SCR2b, and diodes D14 and D15 in FIG. 2 and by SCR2 and bridge 19 in FIG. 3. SCR2a and SCR2b of FIG. 2 have only a 50% duty cycle, whereas the duty cycle of SCR2 of FIG. 2 is 100%. Thus, although the circuit of FIG. 2 involves more components, they can be less expensive than the components of the circuit in FIG. 3. Of course, particular environmental conditions may make one circuit preferable over the other. Environmental conditions, of course, include the ability to dissipate heat.

Figure 4:
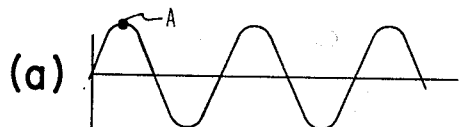

In FIG. 4 waveform (a) represents the line voltage. Point A on the line voltage waveform represents the point at which motor 25 can start when controlled by conventional start circuits. If the motor does start at this point, a maximum electrical noise signal is generated. Waveform (b) shows the motor or load current under conventional start circuit operation. Reference character B indicates the large noise spike which occurs when the peak line voltage is applied across the distributed capacitance of the motor windings. Thus, components of this noise spike are shown in waveform (c) which is on a shorter time scale. Waveform (d) represents the motor current when the motor is controlled by circuits of FIG. 2 and FIG. 3. It is seen that the signal for starting the motor is at point D; however, SCR1 continues to conduct until the line voltage goes to zero. Except for waveform (c), all other waveforms have the same time scale.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A motor starting circuit for applying voltage to a motor from an A.C. line and comprising:
   a motor switch connected with said motor and with said line and including a bridge circuit with a pair of diodes respectively in two connected branches of the bridge circuit and with first and second silicon controlled rectifiers respectively in the other two branches of the bridge circuit;
   rectifying means connected with said A.C. line for providing a source of pulsating rectified voltage;
   an impedance network for connecting said source of pulsating voltage with the gates of said silicon controlled rectifiers and with the common point of said rectifiers in said bridge circuit, said impedance network including for each of said gates a resistor and a plurality of series connected diodes disposed in a lead connecting the gate of the silicon controlled rectifier and said source of pulsating voltage;
   a shunt circuit disposed in parallel with said gates and including a third silicon controlled rectifier and a diode connecting this rectifier with each of said leads; and
   means for connecting the gate of said third silicon controlled rectifier with said source of pulsating voltage so as to cause said third rectifier to conduct while preventing said first and second silicon controlled rectifiers from conducting and including a switch for disconnecting the gate of said third silicon controlled rectifier from said source of pulsating voltage so as to cause said third silicon controlled rectifier to cease conduction when said pulsating rectified voltage is at an instantaneous minimum value and at the same time to cause said first and second silicon controlled rectifiers to conduct and thereby effectively connect said motor with said A.C. line.

2. A motor starting circuit as set forth in claim 1 wherein the anodes of said diodes in said bridge circuit are connected with the cathodes of said first and second silicon controlled rectifiers and with said source of pulsating rectified voltage, the anodes of said diodes in said shunt circuit being connected with said leads and the cathodes of these diodes being connected with the anode of said third silicon controlled rectifier and the cathode of said third silicon controlled rectifier being connected with said source of pulsating current, said means for connecting the gate of said third silicon controlled rectifier with said source of pulsating voltage including a resistor.

3. A motor starting circuit for applying voltage to a motor from an A.C. line and comprising:
   a motor switch connected with said motor and with said line and including a bridge circuit and a first silicon controlled rectifier in connection with the bridge circuit for controlling current flow through the bridge circuit;
   rectifying means connected with said A.C. line for providing a source of pulsating rectified voltage;
   an impedance network for connecting said source of pulsating voltage with the gate of said silicon controlled rectifier and with a point in said bridge circuit so that said motor is rendered operative when said silicon controlled rectifier is in current-conducting state, said impedance network including a first resistor and a diode in series and connecting the gate of said silicon controlled rectifier and said source of pulsating voltage;
   a shunt circuit disposed in parallel with said gate and including a second silicon controlled rectifier connected to a point between said resistor and said diode; and
   means for connecting the gate of said second silicon controlled rectifier with said source of pulsating voltage so as to cause said second rectifier to conduct while preventing said first silicon controlled rectifier from conducting and including a resistor of greater value than said first resistor and including also a switch for disconnecting the gate of said second silicon controlled rectifier from said source of pulsating voltage so as to cause said second silicon controlled rectifier to cease conduction when said pulsating rectified voltage is at an instantaneous minimum value and at the same time to cause said first silicon controlled rectifier to conduct and thereby effectively connect said motor with said A.C. line.

References Cited

UNITED STATES PATENTS 3,309,602  3/1967  Euvino et al. _____ 307—133 X
3,390,275  6/1968  Baker _____ 307—133 X ORIS L. RADER, Primary Examiner
ALFRED G. COLLINS, Assistant Examiner U.S. Cl. X.R.

307—133, 252